(12) United States Patent
Dalal

(10) Patent No.: US 6,819,943 B2
(45) Date of Patent: Nov. 16, 2004

(54) SPATIAL SPECTRAL EFFICIENCY FOR WIRELESS RINGS AND NETWORK OF LINKS IN MILLIMETER WAVE (MMW) COMMUNICATION SYSTEMS

(75) Inventor: Yeheskal Dalal, Kfar Saba (IL)

(73) Assignee: Millimetrix Broadband Networks Ltd., Givat Hashlosha (IL)

( * ) Notice: Subject to any disclaimer, the term of this patent is extended or adjusted under 35 U.S.C. 154(b) by 62 days.

(21) Appl. No.: 10/362,442
(22) PCT Filed: Aug. 30, 2001
(86) PCT No.: PCT/IL01/00820
§ 371 (c)(1),
(2), (4) Date: Feb. 24, 2003
(87) PCT Pub. No.: WO02/19591
PCT Pub. Date: Mar. 7, 2002

(65) Prior Publication Data
US 2003/0157908 A1 Aug. 21, 2003

Related U.S. Application Data
(63) Continuation-in-part of application No. PCT/US01/24913, filed on Aug. 9, 2001.
(60) Provisional application No. 60/229,065, filed on Aug. 31, 2000.

(51) Int. Cl.[7] .................................................. H04B 1/38
(52) U.S. Cl. ..................... 455/562.1; 455/63.1; 455/570
(58) Field of Search ............................. 455/542.1, 570, 455/114.2, 115.2, 501, 502, 63.1, 67.11, 67.13, 67.15, 550.1, 553.1, 560

(56) References Cited
U.S. PATENT DOCUMENTS
5,406,589 A * 4/1995 Iwamatsu et al. ........... 375/349
6,473,596 B1 * 10/2002 Stamper et al. ............ 455/63.1
6,714,775 B1 * 3/2004 Miller ........................ 455/296
2002/0183013 A1 * 12/2002 Auckland et al. ............. 455/73

* cited by examiner

Primary Examiner—Tony T. Nguyen
(74) Attorney, Agent, or Firm—Mark M. Friedman

(57) ABSTRACT

A communication system (network), such as communication system is a millimeter wave (MMW) communication system, comprise a serial chain of nodes, comprising a middle node (#1) a first adjacent node (#2) on a one side of the middle node and a second adjacent node (#3) on an opposite side of the middle node, each of the middle, first adjacent and second adjacent nodes comprising a transmitter and a receiver, a first antenna at the middle node (#1) for transmitting and receiving over a first link with the second adjacent node (#3), a second antenna at the middle node (#1) for transmitting and receiving over a second link with the first adjacent node (#2) and means for performing interference cancellation in one or both of the transmitter and receiver of the middle node. Various embodiments of multidimensional equalizer are disclosed for performing interference cancellation. A transmit interference canceller is disclosed comprising means for convolving a signal intended for transmission to a one adjacent node with a equalized version of a signal intented for transmission to the other adjacent node. Receive interference cancellation can be done with or without mitigating phase noise. Transmit interference cancellation can be done with or without mitigating phase noise. The invention can be used with or without employing Automatic Transmitter Power Control (ATPC) at the nodes. The invention can be used employing various modulations on links between the various nodes of the network. Techniques are disclosed for setting up the links of the network.

25 Claims, 7 Drawing Sheets

SPATIAL SPECTRAL EFFICIENCY FOR WIRELESS RINGS AND NETWORK OF LINKS IN MILLIMETER WAVE (MMW) COMMUNICATION SYSTEMS

CROSS-REFERENCE TO RELATED APPLICATIONS

This is a continuation-in-part of commonly-owned, copending U.S. Provisional Patent Application. No. 60/229, 065, filed Aug. 31, 2000.

This is also a continuation-in-part of commonly-owned, copending International Patent Application No. PCT/US01/94913, filed on 9 Aug. 2001, and incorporated in its entirety by reference herein.

TECHNICAL FIELD OF THE INVENTION

The invention relates to the design and implementation of wireless rings and network of links in millimeter wave (MMW) line of sight wireless communications.

BACKGROUND OF THE INVENTION

It is normally necessary to obtain a "spectrum license" before using a frequency band for wireless communication. This is true of millimeter wave (MMW) frequencies, as it is for most other frequency bands. Spectrum licenses for MMW communications frequencies are issued by agencies responsible for management of the electromagnetic spectrum, and generally permit the use of two frequency bands for full-duplex (bi-directional, concurrent) communications—one band for transmitting (Tx) and one band for receiving (Rx).

FIG. 1 is a graphical representation of a typical single spectrum license 100 for full-duplex MMW communication comprising a first frequency band 102 and a second frequency band 104. The first frequency band 102 ("Channel 1") centers about a first frequency f1 and has a first bandwidth Δf1. The second frequency band 104 ("Channel 2") centers about a second frequency f2 and has a second bandwidth Δf2. The second frequency f2 is distinct and offset from the first frequency f1. The second bandwidth Δf2 is typically substantially equal to the first bandwidth Δf1. In the context of the present invention, the first frequency band 102 is used for communication in a first direction between two "nodes" of a MMW communication network, and is generally indicated by a solid line with a left-pointing arrowhead, and the second frequency band 104 is used for communication in a second direction between the two nodes, and is generally indicated by a dashed line with a right-pointing arrowhead When referring to spectrum licenses in subsequent figures, dashed and solid lines will be used to represent the two distinct frequencies of a spectrum license, with arrowheads indicating the direction of communication, from transmitter to receiver. A bi-directional communication path between two adjacent nodes communicating over two distinct frequency bands is referred to as a "link," and each link uses one spectrum license.

FIG. 2 is a block diagram of a multi-node MMW communication network 200 comprising a "chain" (or "ring") of communication nodes 202, 204, 206, 208, 210, 212, and 214. The system 200 employs multiple frequency licenses between multiple nodes.

The first node 202 (#1) communicates with the second node 204 (#2) over a link 216 via a first frequency band 216a and a second frequency band 216b. The first frequency band 216a is used for communications from the second node 204 to the first node 202 and the second frequency band 216b is used for communications from the first node 202 to the second node 204.

The first node 202 (#1) communicates with the third node 206 (#3) over a link 218 via a first frequency band 218a and a second frequency band 218b. The first frequency band 218a is used for communications from the third node 206 to the first node 202 and the second frequency band 218b is used for communications from the first node 202 to the third node 206.

The second node 204 (#2) communicates with the fourth node 208 (#4) over a link 220 via a first frequency band 220a and a second frequency band 220b. The first frequency band 220a is used for communications from the second node 204 to the fourth node 208 and the second frequency band 220b is used for communications from the fourth node 208 to the second node 204.

The third node 206 (#3) communicates with the fifth node 210 (#5) over a link 222 via a first frequency band 222a and a second frequency band 222b. The first frequency band 222a is used for communications from the third node 206 to the fifth node 210 and the second frequency band 222b is used for communications from the fifth node 210 to the third node 206.

The fourth node 208 (#4) communicates with the sixth node 212 (#6) over a link 224 via a first frequency band 224a and a second frequency band 224b. The first frequency band 224a is used for communications from the sixth node 212 to the fourth node 208 and the second frequency band 224b is used for communications from the fourth node 208 to the sixth node 212.

The fifth node 210 (#5) communicates with the seventh node 214 (#7) over a link 226 via a first frequency band 226a and a second frequency band 226b. The first frequency band 226a is used for communications from the seventh node 214 to the fifth node 210 and the second frequency band 226b is used for communications from the fifth node 210 to the seventh node 214.

Any ring/chain of "n" nodes can be implemented with at most "n" spectrum licenses, but in practice the required number of licenses is usually considerably smaller in point-to-point, line of sight MMW communication. In the system 200 of FIG. 2, some of the links 216, 218, 220, 222, 224 and 226 can use common spectrum licenses. The actual number of spectrum licenses used to implement a network of nodes is selected based upon the geometry of the network, the directionality of antennas, the local geometry of each node site and antenna polarization employed at the nodes. In combination, these parameters determine the amount of interference between nodes employing the same spectrum license. MMW receiving systems are frequency-selective enough that "cross-band" interference (interference between transmissions from different frequency bands) is negligible.

For example, if the antennas for the second node 204 (#2) and the fourth node 208 (#4) exhibit a high degree of electromagnetic separation from those of the third node 206 (#3) and the fifth node 210 (#5), then the links 220 and 222 can employ the same spectrum license. Because of the short wavelength of MMW frequencies, MMW antennas are inherently highly directional. As a result, a high degree of electromagnetic separation between nodes can be achieved in MMW when the antennas for those nodes are not aimed at one another. In some cases, the combination of antenna directionality and physical separation between independently communicating pairs of nodes ensures negligible interference therebetween, permitting re-use of a single spectrum license.

The basic building block of a multi-node point-to-point MMW network is a serial chain of three nodes, communicating using two links (which may or may use the same spectrum license, as discussed above) between a middle node and two adjacent nodes on opposite sides of the middle node. For example, the first node 202, second node 204 and third node 206 of FIG. 2 form such a chain (A chain of two nodes using only one spectrum license is a trivial case and does not account for the effects of inter-node interference that exists in longer chains of nodes. A three-node chain is the minimum size network subset that exhibits these interference effects.)

In a typical serial chain of three nodes, the two adjacent links often employ two different spectrum licenses. A necessary (but not sufficient) condition for the use of a common spectrum license is that the "middle" (intermediate) node of the three node chain transmits to both adjacent nodes using one frequency band (channel) of a spectrum license, and receives transmissions from both adjacent nodes via the other frequency band of the spectrum license. For example, consider a case where all of the links 216, 218, 220, 222, 224 and 226 of FIG. 2 employ the same spectrum license. In this case, all of the first frequency bands 216a, 218a, 220a, 222a, 224a and 226a would be the same and all of the second frequency bands 216b, 218b, 220b, 222b, and 224b would be the same. Node #1 202 transmits to nodes #2 and #3 (204 and 206) on the second frequency band (216b, 218b) and receives from nodes #2 and #3 (204 and 206) on the first frequency band (216a, 218a). Node #2 (204) transmits to nodes #1 and #4 (202 and 208) on the first frequency band (216a, 220a) and receives from nodes #1 and #4 (202 and 208) on the second frequency band (216b, 220b). Node #3 (206) transmits to nodes #1 and #5 (202 and 210) on the first frequency band (218a, 222a) and receives from nodes #1 and #5 (202 and 210) on the second frequency band (218b, 222b). Node #4 208 transmits to nodes #2 and #6 (204 and 212) on the second frequency band (220b, 224b) and receives from nodes #2 and #6 (204 and 212) on the first frequency band (220a, 224a). Node #5 210 transmits to nodes #3 and #7 (206 and 214) on the second frequency band (222b, 226b) and receives from nodes #3 and #7 (206 and 214) on the first frequency band (222a, 226a). In the case of each node, transmission to both adjacent nodes occurs in one frequency band and reception from both adjacent nodes occurs in the other frequency band. Because of this, and because of the frequency selectivity of MMW receivers, transmissions at any node do not interfere in any significant way with reception. This property is referred to hereinafter as "transmit-receive separation".

In the case described above where all of the links (216, 218, 220, 222, 224 and 226) employ the same spectrum license, transmit-receive separation prevents interference within a node due to its own transmissions. Attention is now directed to interference from other nodes, using node #1 202 as the point of reference.

Node #1 does not experience interference from node #4 208 or node #5 210, because both nodes transmit using the second frequency band (220b, 222b) while node #1 202 receives only on the first frequency band (216a, 218a). Frequency selectivity limits cross-band interference to negligible levels. Since appreciable sources of interference with node #1 202 can only occur in the first frequency band, the only possible remaining sources of interference come from node #2 204, node #3 206, node #6 212 and node #7 214, which transmit on the first frequency band (216a, 218a, 224a and 226a).

In a chain of nodes, nodes adjacent to one another are referred to herein as "first neighbors", nodes separated in the chain by another node are referred to as "second neighbors", nodes separated in the chain by two other nodes are referred to as "third neighbors", and so on. Accordingly, node #1 202 and node #2 204 are first neighbors, node #1 202 and node #4 208 are second neighbors, and node #1 202 and node #6 212 are third neighbors.

Evidently, the only significant sources of interference in a chain of nodes of this type are from odd-numbered neighbors, i.e., first neighbors, third neighbors, etc. However, in any likely network configuration, third neighbors (and those beyond "third") are likely to be aimed considerably off-angle with respect to one another. That is, third neighbors are not aimed at one another, and are generally aimed quite far away from one another. Due to the high degree of directionality of MMW antennas this contribute to a high degree of angle separation between third (and higher numbered) neighbors. In typical MMW networks, this angle separation translates to signal attenuation (signal separation) of 60 dB, or better. Therefore, the main sources of interference are adjacent nodes (first neighbors). Referring to the aforementioned three-node building block, all appreciable interference at any node resides completely within the building block that includes its two first neighbors. In the case of node #1 202, all appreciable interference occurs from its two first neighbors, node #2 204 and node #3 206.

In the case where the two links of a three-node building block use two different spectrum licenses, there is inherently a sufficient electromagnetic separation (frequency selectivity) to prevent cross-band interference. FIG. 3 is a block diagram of a three-node building block 300, comprising three nodes, a first node 302 (#1) having a first antenna 302a and a second antenna 302b, a second node 304 (#2) and a third node 306 (#3). The first antenna 302a communicates (full duplex, bi-directionally) with the third node 306 via a link 318 comprising a first frequency band 318a and a second frequency band 318b. The first antenna 302a receives transmissions from the third node 306 via the first frequency band 318a and transmits to the third node 306 via the second frequency band 318b. The second antenna 302b communicates (full duplex, bi-directionally) with the second node 304 via a link 316 comprising a first frequency band 316a and a second frequency band 316b. The second antenna 302b receives transmissions from the second node 304 via the first frequency band 316a and transmits to the second node 304 via the second frequency band 316b. In the case illustrated in FIG. 3, the first link 316 and the second link 318 use different spectrum licenses, ensuring that electromagnetic separation (frequency selectivity) reduces interference at either the first antenna 302a or the second antenna 302b of the first node to negligible (acceptable) levels. Accordingly, the four receive and transmit paths associated with the four frequency bands 316a, 316b, 318a, and 318b used by links 316 and 318 can be viewed as four completely independent channels.

In the case where the two links of a three-node building block use the same spectrum license, frequency re-use is doubled, but there is greater potential for interference.

FIG. 4 is a block diagram of another three-node building block 400, comprising three nodes, a first node 402 (#1) having a first antenna 402a and a second antenna 402b, a second node 404 (#2) and a third node 406 (#3). ). The first antenna 402a communicates (full duplex, bi-directionally) with the third node 406 via a link 418 comprising a first frequency band 418a and a second frequency band 418b.

The first antenna 402a receives transmissions from the third node 406 via the first frequency band 418a and transmits to the third node 406 via the second frequency band 418b. The second antenna 402b communicates (full duplex, bi-directionally) with the second node 404 via a link 416 comprising a first frequency band 416a and a second frequency band 416b. The second antenna 402b receives transmissions from the second node 404 via the first frequency band 416a and transmits to the second node 404 via the second frequency band 416b. Unlike the links 316 and 318 of the building block 300 of FIG. 3, which use different spectrum licenses, the two links 416 and 418 use the same spectrum license. As a result, the two first frequency bands 416a and 418a are the same and the two second frequency bands 416b and 418b are the same. As a result, the separation between the desired receive signal in the first antenna 402a (in the first frequency band 418a) which comes from the third node 406 and an undesired or "interfering" signal from the second node 404 (in the same frequency band 416a) is due only to the angular separation between the two antenna 402a and 402b. Since transmissions from node #2 404 to the first node are aimed directly at the second antenna 402b which is closely co-located with the first antenna 402a, the aiming of transmissions from node #2 does not contribute to this angle separation, and a portion 430b of the signal transmitted from node #2 404 to the second antenna 402b of the first node "leaks into" the first antenna 402a. In a typical point-to-point MMW communications system as described herein with respect to FIG. 4, the ratio of an interfering signal from an adjacent node to a desired signal can reach as high as −30 dB. The same situation holds in reverse for the second antenna 402b. That is, a portion 430a of the signal transmitted from node #3 406 to the first antenna 402a of the first node "leaks into" the second antenna 402b.

Depending upon site geometry, node locations and the angle separation between the antennas, interference when using a single spectrum license as described hereinabove with respect to FIG. 4 can be too great for reliable MMW communication. When this occurs, it becomes necessary to resort to using two separate spectrum licenses, reducing frequency re-use and increasing cost.

It should be understood that different modulation schemes can be implemented in MMW communications including, but not limited to, Quadrature Amplitude Modulation (QAM), and Pulse Position Modulation (PPM).

Receive Interference and Transmit Interference

Receive interference and transmit interference are problems which can occur when two or more nodes employ the same frequency license.

FIG. 4 illustrates a typical example of "receive interference". In this example, a signal transmitted to node #1 402 from node #2 404, which is intended for antenna 402b of node #1 402, leaks to antenna 402a of node #1 402. Similarly, antenna 402b receives the leakage of signals transmitted from node #3 406, which are intended for antenna 402a. These signals are referred to as "receive interfering signals". The interference power depends on the geometry of the node site and on the receive pattern of the antennas 402a and 402b. If the antennas 402a and 402b are located exactly back to back (180 degrees separation), the leakage of interfering signal is of the order of −60 to −40 dB (for MMW high directivity antennas). However, if the angle is not 180 degrees, stronger leakage may arise, and may reach the order of −25 dB, depending on the local geometry.

For purposes of the discussion that follows, it is assumed that the receive interference at a given antenna of a given node, is solely a result of transmission made from an adjacent node, which is intended for the other antenna at the given node. This would result from the two links to the two nodes adjacent the given node employing the same frequency license.

The amount of receive interference depends on whether or not ATPC is used, and whether or not the stations (nodes) employ different modulation schemes. Channel attenuation due to weather effects (i.e., rain attenuation, or CPA in dually polarized systems) must also be taken into account The following cases (A–D) are therefore possible.

A) Without ATPC, Same Modulation for all links: Link lengths may not be constant along the chain/ring, depending on the physical locations of the nodes. Moreover, according to weather conditions, one link can suffer from high attenuation due to rain, while the other can see clear sky. Typical accumulated rain attenuation value in MMW links can reach 30 dB in bad weather conditions. Thus the dynamic range of receive interference to desired receive signal can be very high, from the range of −60 to −40 dB without rain, to the range of −30 to −10 dB, depending on angles between antennas and weather conditions.

B) With ATPC, Same Modulation for all links:—Typical values of ATPC in MMW systems is 10 to 25 dB dynamic range. With 20 dB ATPC, the receive interference may be reduced to −20 dB, or worse.

C) Without ATPC, Different Modulations along the chain/ring: Employing different modulations along the chain/ring further increases the dynamic range of receive interference to desired signal. In the absence of ATPC, each antenna transmits with the maximal possible power. When different modulations are employed, the maximal power varies according to the required back-off. The difference in back-off required for 16 QAM and 128 QAM is in the order of 5 dB (this takes into account not only the different peak-to-r.m.s. of the constellations, but also the sensitivity to impairments). Consider, for example, the following. Assume, for example, that the link 416 from node #2 404 to node #1 402 in FIG. 4 employs 16 QAM (or 16 TCM), while the link 418 from node #3 406 to node #1 402 employs 128 QAM (or 128 TCM). This enhances the receive interference at antenna 402a by an amount of 4 dB, due to the fact that the back-off required by the transmitter in node #3 406 is larger by 5 dB than that required by the transmitter in node #2 404. Since ATPC is not present, the fact that decoding 16 QAM needs lower received power cannot be taken into account. Thus, the conclusion is, as in the case of fixed modulations among the three stations, when no ATPC is present, the ratio between receive interference and desired signal can exceed considerably the value of −30 dB.

D) With ATPC, Different Modulations alone the chain/ring: In this case, the receive interference is increased relative to that in case B (with ATPC, same modulation) by an amount equal to the difference in sensitivity. The difference in sensitivity between 16 QAM and 128 QAM may typically be 9 dB. Thus, the interference may be roughly only 10 dB below the desired signal.

FIG. 5 is a block diagram of a three-node building block 500, comprising three nodes, a first node 502 (#1) having a first antenna 502a and a second antenna 502b, a second node 504 (#2) and a third node 506 (#4). The first antenna 502a communicates (full duplex, bi-directionally) with the third node 506 via a link 518 comprising a first frequency band 518a and a second frequency band 518b. The first antenna 502a receives transmissions from the third node 506 via the second frequency band 518b and transmits to the third node 506 via the first frequency band 518a. The second antenna 502b communicates (full duplex, bi-directionally) with the second node 504 via a link 516 comprising a first frequency band 516a and a second frequency band 516b. The second antenna 502b receives transmissions from the second node 504 via the second frequency band 516b and transmits to the second node 504 via the first frequency band 516a. As was the case with the links 416 and 418 of the building block 400 of FIG. 4, the two links 516 and 518 use the same spectrum license. As a result, the two first frequency bands 516a and 518a are the same and the two second frequency bands 516b and 518b are the same.

FIG. 5 illustrates a typical example of "transmit interference". In this example, only one spectrum license is employed for the two links 516 and 518; Due to the out-of-main beam linkage, the signal transmitted from antenna 502b of node #1 502, which is intended for node #2 504, leaks also in the direction of node #3 506, as indicated by the arrow 532b, and is received at node #3 506 as interference, owing to the fact that channels 1 coincide. Similarly, the signal transmitted from antenna 502a of node #1, which is intended for node #3, leaks, as indicated by the arrow 532a, to node #2. This leakage is referred to as "transmit interference signals".

As was the case with receive interference, the amount of transmit interference depends on whether or not ATPC is used, and whether or not the stations employ different modulation schemes. The following cases (E–H) are therefore possible:

E. Without ATPC, Same Modulation for all links: In this case, the ratio of transmit interference to desired signal is determined solely by the amount of out-of-main beam leakage (directivity) of the antenna and the neighborhood of the antenna. This is due to the fact that even in case of strong rain attenuation, the desired and interfering signals are subject to the same rain attenuation, and the constellations and transmission power are similar. Thus the transmit interference is very weak in case of good direction separation (for MMW, about −60 to −40 dB), and can deteriorate to −30 dB or below, depending on the angle between the links and the site geometry.

F. With ATPC, Same Modulation for all links: Typical ATPC dynamic range is 10 to 20 dB. With 20 dB ATPC, transmit interference to desired signal ratio can reach a level of −20 dB.

G. Without ATPC, Different Modulations alone the chain/ring: Transmit interference deteriorates from the situation of no ATPC and one modulation, by an amount equal to the differences between required back-off, which may reach values of the order of 5 dB between 16 QAM and 128 QAM for example. This results in a value of about −25 dB transmit interference. The maximal allowed interference at each modulation is determined by its sensitivity.

H. With ATPC, Different Modulations alone the chain/ring: In this case transmit interference may deteriorate by an amount of 5 dB relative to the case of ATPC with one modulation scheme. Thus it may reach −15 dB or worse.

The above-described scenarios for receive and transmit interference are summarized in the following table.

|  | with/out ATPC | same/different modulation | receive interference | transmit interference |
|---|---|---|---|---|
| A,E | without | Same | −30 dB | −60, −40, −30 db |
| B,F | with | Same | −20 dB | −20 dB |
| C,G | without | Different | −30 dB | −25 dB |
| D,H | with | Different | −10 dB | −15 dB or worse |

Evidently there is a need for a technique to improve frequency re-use and/or to compensate for the effects of receive and transmit interferences between nodes of a multi-node MMW network.

BRIEF DESCRIPTION (SUMMARY) OF THE INVENTION

It is a general object of the invention to provide a technique for improving the frequency re-use of links in (i.e., improving the spatial spectral efficiency of) a wireless ring and network of links, in systems where the electromagnetic separation between antennas does not suffice to ensure low interference, such as is often the case in millimeter wave (MMW) communications.

Generally, the basic building block of a multi-node point-to-point MMW network is a serial chain of three nodes (stations), a "middle" node (#1) and two "adjacent" (or "first neighbor") nodes (#2, #3) on either side of the middle node, communicating using two links (link 1–2, link 1–3). When a common spectrum license is used for the two links, the "middle" node transmits to both adjacent nodes using one frequency band (channel) of the spectrum license, and receives transmissions from both adjacent nodes using the other frequency band of the spectrum license. Generally (without the present invention), interference at the intermediate node connecting the two links is relatively high, since antennas of the adjacent nodes are directed toward the intermediate node, thus there is an angle separation (directivity) due to only one antenna. Angle separation due to only one antenna may not be enough to ensure low interference.

According to the invention, a communication system (network), such as communication system is a millimeter wave (MMW) communication system, comprise a serial chain of nodes comprising a middle node (#1) a first adjacent node (#2) on a one side of the middle node and a second adjacent node (#3) on an opposite side of the middle node, each of the middle, first adjacent and second adjacent nodes comprising a transmitter and a receiver, a first antenna at the middle node (#1) for transmitting and receiving over a first link with the second adjacent node (#3), a second antenna at the middle node (#1) for transmitting and receiving over a second link with the first adjacent node (#2); and means for performing interference cancellation in one or both of the transmitter and receiver of the middle node. Various embodiments of multidimensional equalizer are disclosed for performing interference cancellation. A transmit interference canceller is disclosed comprising means for convolving a signal intended for transmission to a one adjacent node with a equalized version of a signal intended for transmission to the other adjacent node. Receive interference cancellation can be done with or without mitigating phase noise. Transmit interference cancellation can be done with or without mitigating phase noise. The invention can be used with or without employing Automatic Transmitter Power Control (ATPC) at the nodes. The invention can be used employing various modulations on links between the various nodes of the network. Techniques are disclosed for setting up the links of the network.

According to the invention, interference cancellation is performed at the transmitter only, or at the receiver only, or at both the transmitter and the receiver, depending on the specific network implementation. Interference cancellation at the receiver is done with a multi-dimensional equalizer. Interference cancellation at the transmitter is done with a multi-dimensional equalizer, and utilizes a feed back channel from the node to which the transmission is done The receive interference cancellation mitigates phase noise with the aid of a set of PLLs located on the branches of the equalizer, before or after the equalizer, or by using a common carrier reference. Transmit interference cancellation mitigates phase noise effects by using a common carrier reference.

The invention may utilize a three-stage setup process for cases where simultaneous setup of all links of the network is required. The setup is done in three stages: first, only the receive interference cancellation is activated, at the second step feedback channel is made available, and at the third step the transmit interference cancellation is activated. The setup process ensures that proper interference cancellation is achieved, although feedback channels are not initially available. The setup process requires that ATPC is turned off during setup, or the use of a smaller constellation during setup, in order to reduce the transmit interference during setup. The invention may alternatively utilize a link-by-link sequential setup process. In this case, the setup is done in three stages for each node. First receive interference cancellation is activated, at the second stage feedback channel is made available, and at the third stage transmit interference cancellation is activated.

The present invention improves frequency re-use in systems where the electromagnetic separation between antennas does not suffice to ensure low interference. It enables the use of one spectrum license in two adjacent links, by performing interference cancellation at the intermediate node. The invention is applicable to networks with stations employing single antenna, multi antenna, dual polarization, and combinations of the above. The invention is applicable to various network topologies, in particular rings and chain of links. The invention enables the implementation of a ring or chain of links employing only one spectrum license, provided that the network topology ensures that for every node, third neighbors and further does not cause significant interference. This requirement is typically met at MMW networks. The invention employs a frequency channel allocation that ensures that the transmission at each node does not interfere with reception at the same node. The invention is applicable in networks employing ATPC and various modulations along the various links.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

The structure, operation, and advantages of the present preferred embodiment of the invention will become further apparent upon consideration of the following description, taken in conjunction with the accompanying figures) wherein.

DETAILED DESCRIPTION OF THE INVENTION

Millimeter wave (MMW) communications systems comprising nodes, links between adjacent nodes, two antennas at each node, frequency licenses have been discussed hereinabove, with respect to FIGS. 1–5. The problems of receive interference and transmit interference were discussed.

The overall purpose of the present invention is to increase frequency re-use by providing tools for mitigating these two kinds of interference and, as described in greater detail hereinbelow, this is done with the aid of interference cancellation devices at the transmitters and receivers of the nodes and (optionally) with automatic transmit power control (ATPC()) at the transmitters and (optionally) to systems using different modulations and coding for different links.

The present invention enables the implementation of the basic building block of a chain/ring—namely a triplet of nodes (stations) linearly connected with two links—by a single spectrum license. This is made possible with the use of interference cancellation. With the aid of the current invention, the frequency re-use of any ring/chain of links can be increased (sometimes by a factor of 2), by dividing it into basic (possibly overlapping) building blocks of 3 linearly-connected stations, and applying the invention to each or some of the triplets. Thus the current invention is not limited to networks of three stations only, but is applicable to any ring/chain of links.

The interference cancellation is done via multidimensional equalization at the receiver, and/or pre-transmission interference cancellation, with or without ATPC, at the transmitter. The purpose of ATPC at the transmitter, if implemented, is to facilitate the receive interference cancellation by reducing the wide dynamic range of received signals, typical to MMW communication systems.

Receive Interference Cancellation

The present invention uses a multidimensional adaptive equalizer at the receiver, in order to reduce or completely cancel the effect of receive interference.

Figure 1:
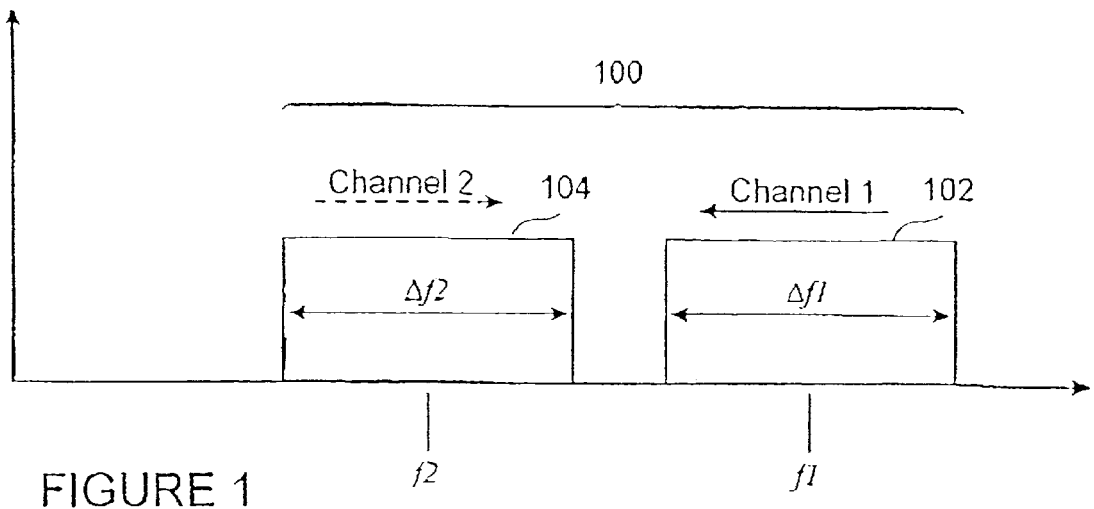
FIG. 1 is a graphical representation of a typical single spectrum license employing one transmit (Tx) channel and one receive (Rx) channel, according to the prior art.
Figure 2:
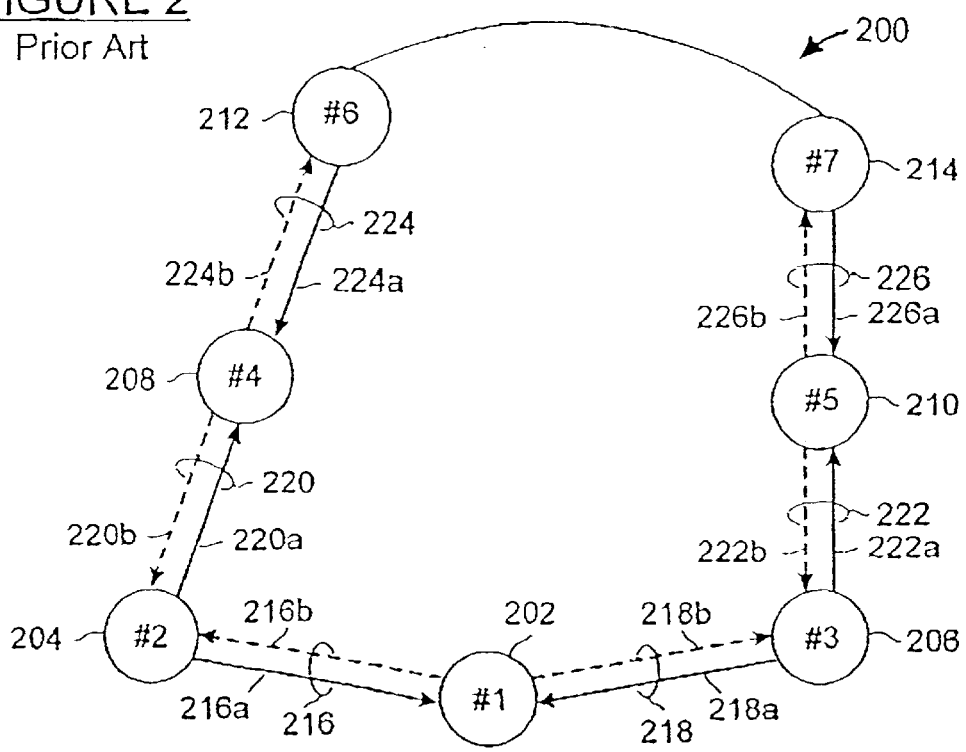
FIG. 2 is a diagram illustrating a typical chain of links/ring network, showing several nodes, and several links between nodes using several spectrum licenses, according to the prior art.
Figure 3:
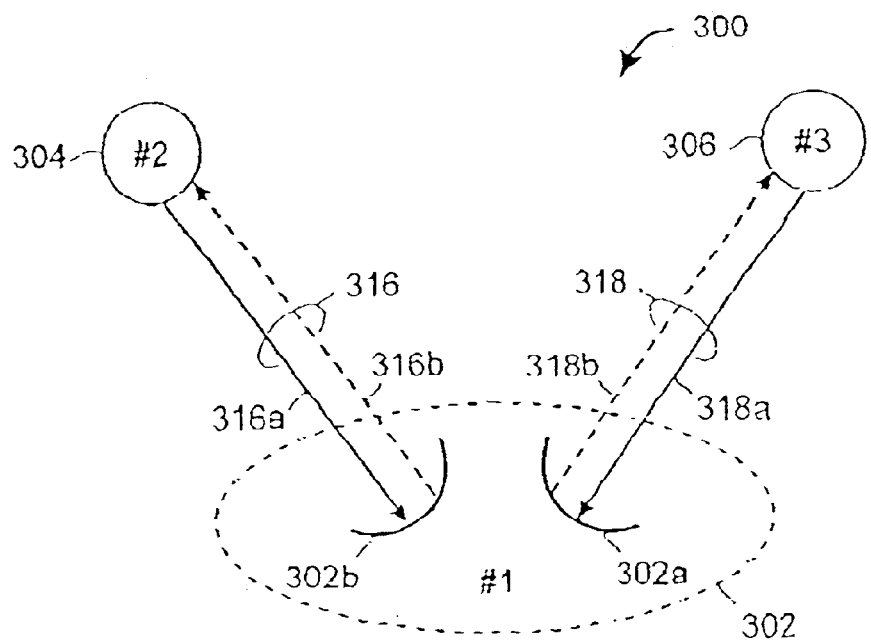
FIG. 3 is a diagram illustrating antennas, and receive/transmit signals at a middle node (#1) of a typical chain of links/ring network, when two links employ different spectrum licenses, according to the prior art.
Figure 4:
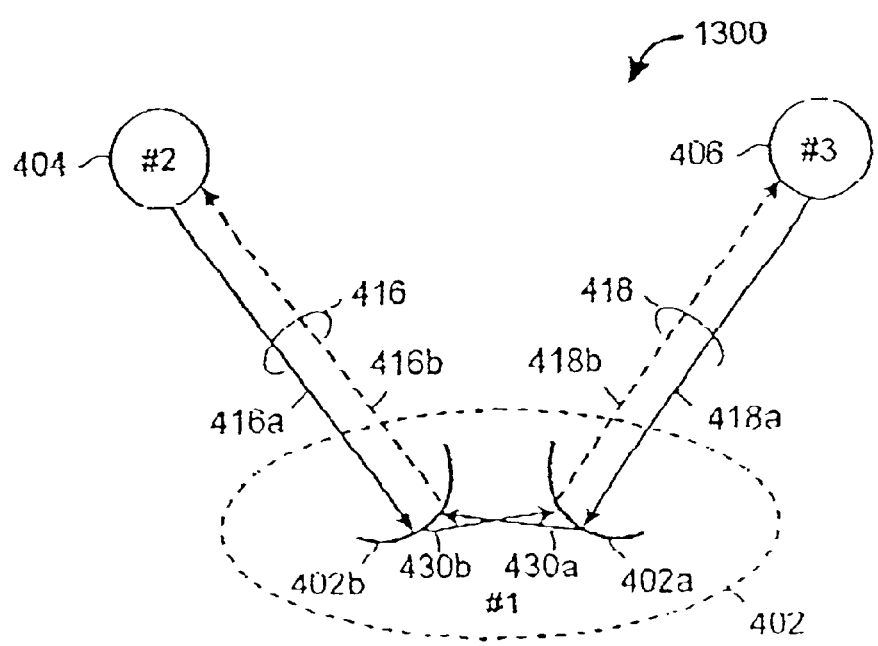
FIG. 4 is a diagram illustrating receive interference at a middle node (#1) of a typical chain of links/ring network, when two links employ the same spectrum license, according to the prior art.
Figure 5:
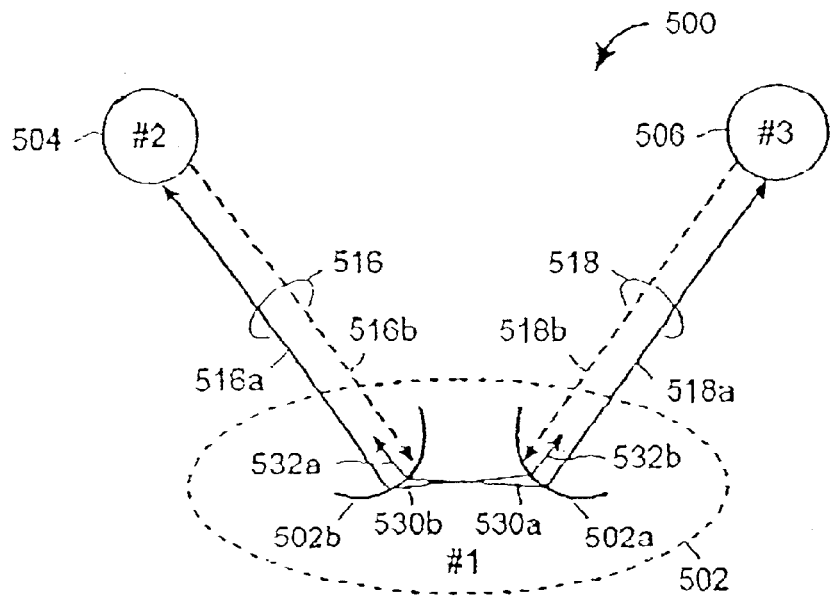
FIG. 5 is a diagram illustrating transmit interference at a middle node (#1) of a typical chain of links/ring network, when two links employ the same spectrum license, according to the prior art.
Figure 6:
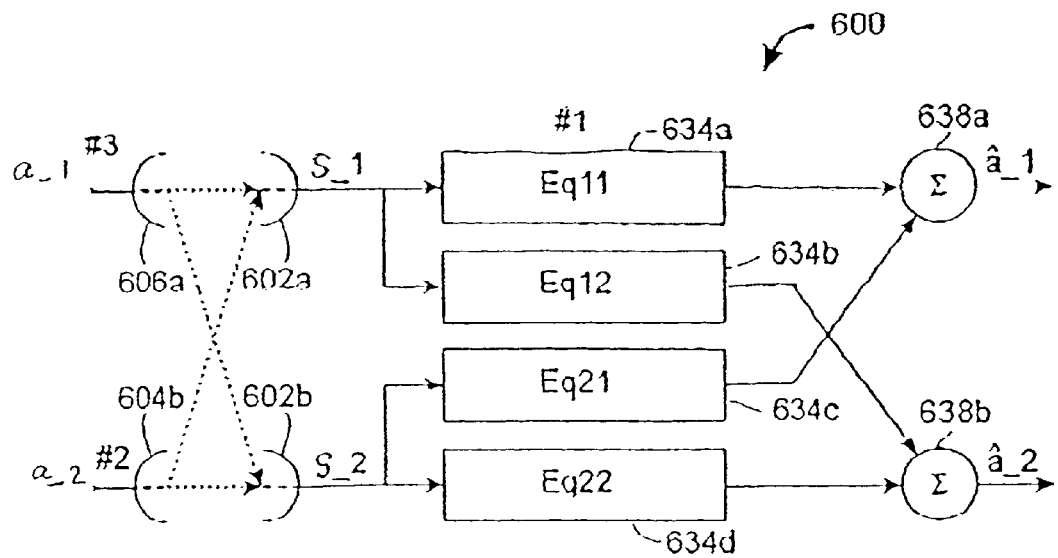
FIG. 6 is diagram illustrating an embodiment of a receive interference cancellation scheme, according to the invention.

FIG. 6 illustrates an embodiment of a multidimensional adaptive equalizer 600 of the present invention. The dynamic range of the signals involved, in various scenarios (with or without ATPC, with the same or different modulation schemes) has been described hereinabove. The diagram of FIG. 6 focuses on the equalizer section of a MMW radio receiver, in complex baseband representation. Elements which are usually included in MMW radio receivers, before and after the equalizer, are omitted for illustrative clarity, such as the radio path down-converting the antenna signal to IF and to baseband, analog-to-digital conversion, receiver pulses, timing units, PLLs, decoders (if error-control coding is used in the system), etc. One of ordinary skill in the art to which the present invention most nearly pertains will understand the operation and implementation of the invention in a receiver, based on the descriptions set forth herein.

Four antennas 602a, 602b, 606a and 604b are shown in FIG. 6. The two antennas 602a and 602b are associated with the receiver being described in the current node (e.g., node #1). The antennas 606a is a transmit antenna of a neighboring node (e.g., node #3), and the antenna 604b is a transmit antenna of the other (node #2) of two neighboring nodes. The antenna 606a transmits a signal stream a_1. The antenna 604b transmits a signal stream a_2. It is intended that the antenna 602a receive the signal stream a_1, and that the antenna 602b receive the signal stream a_2. However, as schematically illustrated, there is receive interference as a portion of the signal stream a_1 leaks into the antenna 602b and a portion of the signal stream a_2 leaks into the antenna 602a.

Each of the antennas 602a, 602b, 606a and 604b can comprise a single antenna, an antenna array, a dual polarization antenna, or an antenna array which includes dual polarization elements.

Four adaptive equalizer blocks (Eq11) 634a, (Eq12) 634b, (Eq21) 634c and (Eq22) 634d are shown in FIG. 6, each having an input and an output. Each adaptive equalizer block can comprise a multidimensional adaptive equalizer, depending on whether the system is a single antenna, multi-antenna, dual polarization, or a combination of multi-antenna and dual polarization.

The signal (symbol stream) S_1 from the antenna 602a (with receive interference content) is provided to the two equalizer blocks Eq11 and Eq12.

The signal (symbol stream) S_2 from the antenna 602b (with receive interference content) is provided to the two equalizer blocks Eq22 and Eq21.

The output of the equalizer block Eq11 is provided to a first input of a first summing junction 638a. The output of the equalizer block Eq22 is provided to a first input of a second summing junction 638b. These two equalizer blocks Eq11 634a and Eq22 634d are referred to as "inline equalizers", and are the blocks comprising the (multidimensional) equalizer in case that the two links employ two spectrum licenses (such as described with respect to FIG. 3).

The output of the equalizer block Eq12 is provided to a second input of the second summing junction 638b. The output of the equalizer block Eq21 is provided to a second input of the first summing junction 638a. These two equalizer blocks Eq12 634b and Eq21 634c are referred to as "cross equalizers". The receive interference depends, beside on the link characteristics, also on the geometry of the node site.

The outputs of the summing junctions 638a and 638b are signals (symbol streams) â_1 and â_2, which are interference-cancelled versions of the incoming signals S_1 and S_2, respectively, and are provided to decision units/decoders (not shown) for each of the signals â_1 and â_2, respectively.

The node site has two receive antennas, A 602a and B 602b, as described hereinabove. Generally, the compensation of the receive interference for a given/current antenna (hence, a given link) is done by taking a signal from the other receive antenna, whose IF filter differs from the IF filter of the current antenna. Therefore the cross equalizers Eq12 and Eq21 cannot be identical (should be different), up to a multiplication constant, to the inline equalizers Eq11 and Eq22, but rather must be adaptive. The adaptation is done to optimize performance (e.g., residual MSE at decision point) in detection of the symbol streams, in the same node where the interference canceller is located. Thus no feedback from other receivers is needed, and the adaptation can be fast.

Figure 7:
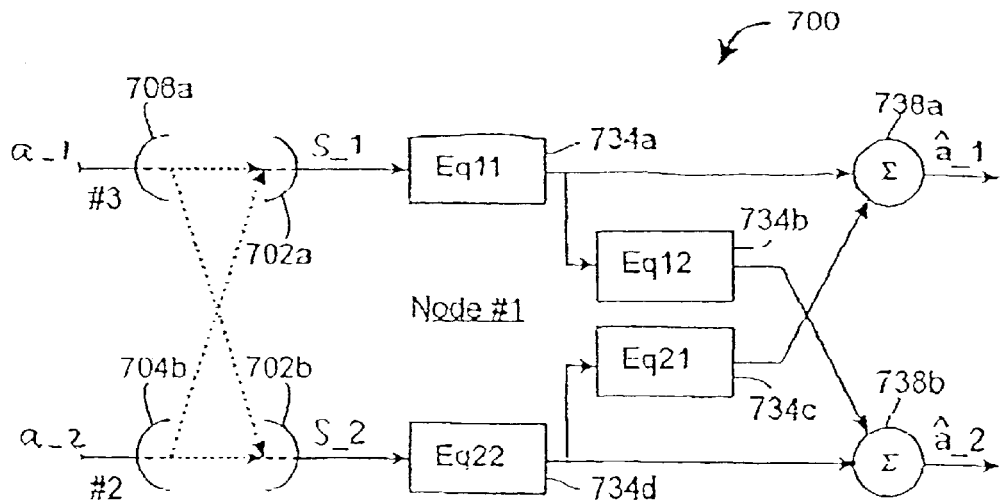
FIG. 7 is diagram illustrating an alternative embodiment of a receive interference cancellation scheme, according to the invention.

FIG. 7 illustrates an alternate embodiment of a multidimensional adaptive equalizer 700 of the present invention, and is essentially a variation of the multidimensional adaptive equalizer 600 of FIG. 6. In a manner similar to that of FIG. 6, the diagram of FIG. 7 focuses on the equalizer section of a MMW radio receiver, in complex baseband representation. Elements which are usually included in MMW radio receivers, before and after the equalizer, are omitted for illustrative clarity, such as the radio path down-converting the antenna signal to IF and to baseband, analog-to-digital conversion, receiver pulses, timing units, PLLs, decoders (if error-control coding is used in the system), etc. One of ordinary skill in the art to which the present invention most nearly pertains will understand the operation and implementation of the invention in a receiver, based on the descriptions set forth herein.

Four antennas 702a, 702b, 706a and 704a are shown in FIG. 7. The two antennas 702a and 702b are associated with the receiver being described in the current node (e.g., node #1). The antennas 706a is a transmit antenna of a neighboring node (e.g., node #3), and the antenna 704b is a transmit antenna of the other (node #2) of two neighboring nodes. The antenna 706a transmits a signal (symbol stream) a_1.

The antenna 704b transmits a signal (symbol stream) stream a_2. It is intended that the antenna 702a receive the signal a_1, and that the antenna 702b receive the signal a_2. However, as schematically illustrated, there is receive interference as a portion of the signal a_1 leaks into the antenna 702b and a portion of the signal a_2 leaks into the antenna 702a.

Each of the antennas 702a, 702b, 706a and 704b can comprise a single antenna, an antenna array, a dual polarization antenna, or an antenna array which includes dual polarization elements.

Four adaptive equalizer blocks (Eq11) 734a, (Eq12) 734b, (Eq21) 734c and (Eq22) 734d are shown in FIG. 7, and each adaptive equalizer block can comprise a multidimensional adaptive equalizer, depending on whether the system is a single antenna, multi-antenna, dual polarization, or a combination of multi-antenna and dual polarization.

The signal S_1 from the antenna 702a (with receive interference content) is provided to the equalizer block Eq11. The signal S_2 from the antenna 702b (with receive interference content) is provided to the equalizer blocks Eq22. These two equalizer blocks Eq11 734a and Eq22 734d are referred to as "inline equalizers", and are the blocks comprising the (multidimensional) equalizer in case that the tho links employ two spectrum licenses (such as described with respect to FIG. 3).

The system 700 of FIG. 7 differs from the system 600 of FIG. 6 mainly in the connection of the two "cross equalizers" Eq12 and Eq21.

The output of the equalizer block Eq11 is provided to a first input of a first summing junction 738a, and to the input of the equalizer block Eq12 734b. The output of the equalizer block Eq22 734d is provided to a first input of a second summing junction 738b, and to the input of the equalizer block Eq21 734c. In a manner similar to that of the system 600, the output of the equalizer block Eq12 734b is provided to a second input of the second summing junction 738b, and the output of the equalizer block Eq21 is provided to a second input of the first summing junction 738a.

The outputs of the summing junctions 738a and 738b are signals (symbol streams) â_1 and â_2, which are interference-cancelled versions of the incoming signals S_1 and S_2, respectively, and are provided to decision units/decoders (not shown) for each signal stream respectively.

In this configuration 700, the cross equalizers Eq12 and Eq21 depend on the link characteristics and on the site geometry, and therefore must be adaptive. However, the geometry of the site and the various IF filters are fixed. Therefore, in general, the cross equalizer Eq12 of FIG. 6 can be expressed as a convolution of the inline equalizer Eq11 with a transversal filter, denoted bar(Eq12), which depends only on the local geometry and the difference between the IF filters, and thus can be constant in time (tuned at system deployment) or adaptive. In the case that bar(Eq12) is adaptive, its adaptation speed can be made slow compared to the adaptation speed of Eq11, since the geometry and the IF filters are not expected to vary fast in time. A similar situation applies to the cross equalizer Eq21 of FIG. 6—namely, it can be replaced by a convolution of the inline equalizer Eq22 with a transversal filter, denoted bar(Eq21), where bar(Eq21) is mainly a result of the local geometry and the difference between the IF filters and can be made fixed in time or slowly adaptive. This justifies the use of the structure of FIG. 7. In some situations, the equalization scheme of FIG. 7 may be advantageous over the one of FIG. 6, due to slower adaptation time of the cross equalizers.

The structure of the receive interference canceller does not depend on whether or not ATPC is used, and on whether or not the three stations involved (#1, #2, and #3) employ more than one modulation. However, presence of ATPC enhances the effectiveness of receive interference cancellation in cases of low electromagnetic separation between antennas, and strong rain attenuation typical to MMW. Preferably, for the receive interference cancellation technique of the present invention to work well, the system should be designed so that the ratio between receive interference and desired signal will not exceed −10 dB. In cases of poor angle separation between antennas and in systems suffering from strong rain attenuation, this can be reached with the aid of ATPC.

Transmit Interference Cancellation

Figure 8:
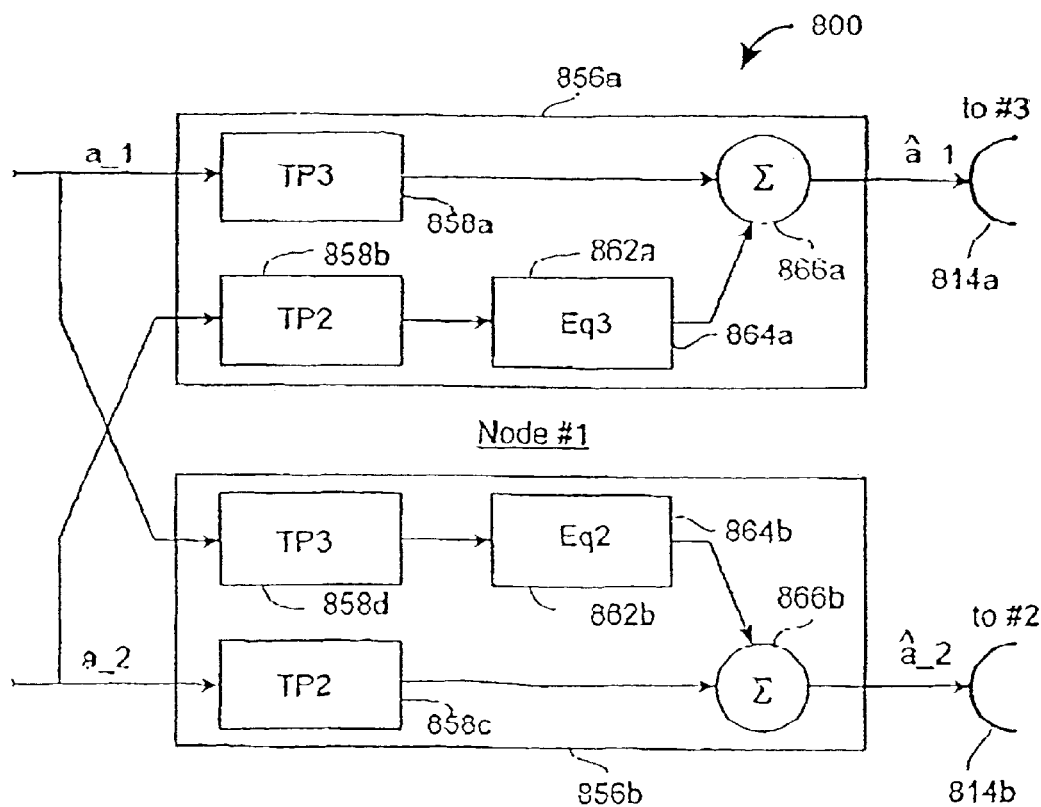
FIG. 8 is diagram illustrating a transmit interference canceller, located at a middle node (#1) of a chain of links/ring network, according to the invention.

FIG. 8 illustrates an embodiment of the invention wherein interference cancellation is performed in the transmitter section of a node to mitigate the transmit interference signals. A transmit interference canceller 800 is shown, and is assumed to be located at node #1. The symbols in the figure are information symbols of an uncoded constellation, or coded symbols, in the case the systems employs error correction coding.

Two transmitters 856a and 856b are shown, connected respectively to two antennas 814a and 814b. The antenna 814a is directed to node #3. The antenna 814b is directed to node #2.

It should be understood that, in general, the transmitters can be implemented as two physically separated units, or as one unit. The cooperation needed between the two transmitters is a common knowledge of the transmission pulses in use by each other, and the information symbols of each other. In case where error correction coding is employed, common knowledge of the coded symbols of each other is needed. In addition, a common reference for the local oscillators of the two transmitters is needed, in order to reduce phase noise effects.

Signals (symbol streams) a_1 and a_2, are provided to transmitters 856a and 856b respectively, to be transmitted to node #3 and to node #2, respectively.

First, canceling the transmit interference in the transmission by the antenna 814a, in the absence of phase noise, will be described. (Phase noise effects are discussed below.) The transmitter 856a receives the signal a_1 intended for node #3, and also has access to the signal a_2 intended for node #2. These symbols are convolved with the transmission pulse TP2 858b of the stream to node #2, then passed through an adaptive equalizer Eq3 862a, and added in a summing junction 866a to the transmission pulse TP3 858a intended for node #3. The adaptive equalizer Eq3 862a compensates the differences which exist between the IF filters (and in general, the analog parts) of the transmitters connected to antennas, and for the local geometry of the node #1 site. It should be noted that, in MMW, the desired signal a_1 transmitted to node #3, and the transmit interference signal a_2 arriving to node #3 due to leakage of antenna 814b of node #1, pass through the same link, and thus see the similar physical channel characteristics. Therefore the adaptive equalizer Eq3 862a at the transmit interference canceller only has to compensate for the difference between IF filters and the local geometry, and thus can have slow adaptation. This is what makes the transmit interference cancellation feasible. The equalizer Eq3 862a opts to optimize performance at node #3, therefore a feed back must exist between nodes #1 and #3. Since the adaptation need not be fast, the feed back between nodes #1 and #3 can be implemented without degrading the system capacity. The adaptation is done to optimize a performance measure at node #3, e.g., residual MSE at the decision point. Since the transmitter (e.g., 856*a*) at which interference cancellation is done and the receiver whose performance is optimized are connected via a common link, feedback can readily be implemented between them.

The situation is essentially identical for canceling the transmit interference in the transmission by the antenna 814*b*, in the absence of phase noise. The transmitter 856*b* receives the symbols a_2 intended for node #2, and also has access to the symbols a_1 intended for node #3. These symbols are convolved with the transmission pulse TP3 858*d* of the stream to node #3, then passed through an adaptive equalizer Eq2 862*b*, and added in a summing junction 866*b* to the transmission pulse TP3 858*c* intended for node #2. The adaptation is done to optimize a performance measure at node #2.

The structure of transmit interference cancellation does not depend on whether or not ATPC is used, and on whether more than one modulation scheme is used among the three nodes (#1, #2, #3). However, in the absence of ATPC the ratio between transmit interference and desired signal is preferably kept below −12 dB, even in case of poor angle separation and different modulations. The presence of ATPC can worsen the situation. In principle, the system should be designed so that the ratio between transmit interference and desired signal sill not exceed −10 dB. In cases of poor angle separation, this can be reached by reducing the dynamic range of modulation backs-off, and/or reducing the dynamic range of ATPC.

Phase Noise Effects and Cancellation

Phase noise constitutes a major impairment in MMW systems. Due to the high frequency of MMW, the carrier suffers from high phase noise. In addition, in MMW systems the outdoor unit must be attached to the antenna back, making transmission with common carriers unfeasible. As a consequence, for example, each radio path from the antenna to the digital part in the multidimensional adaptive equalizer of FIG. 6 adds its own phase noise. The main difficulty is caused by the phase noise at the receive antennas, since in decoding one symbol stream, the interference from other symbol streams must be subtracted coherently. Once the interference is subtracted coherently, the remaining phase noise due to transmit antennas causes no special difficulty, and can be mitigated as in conventional MMW systems which do not employ interference cancellation from different antennas.

Receive Interference Cancellation, with Phase Noise

Figure 9:
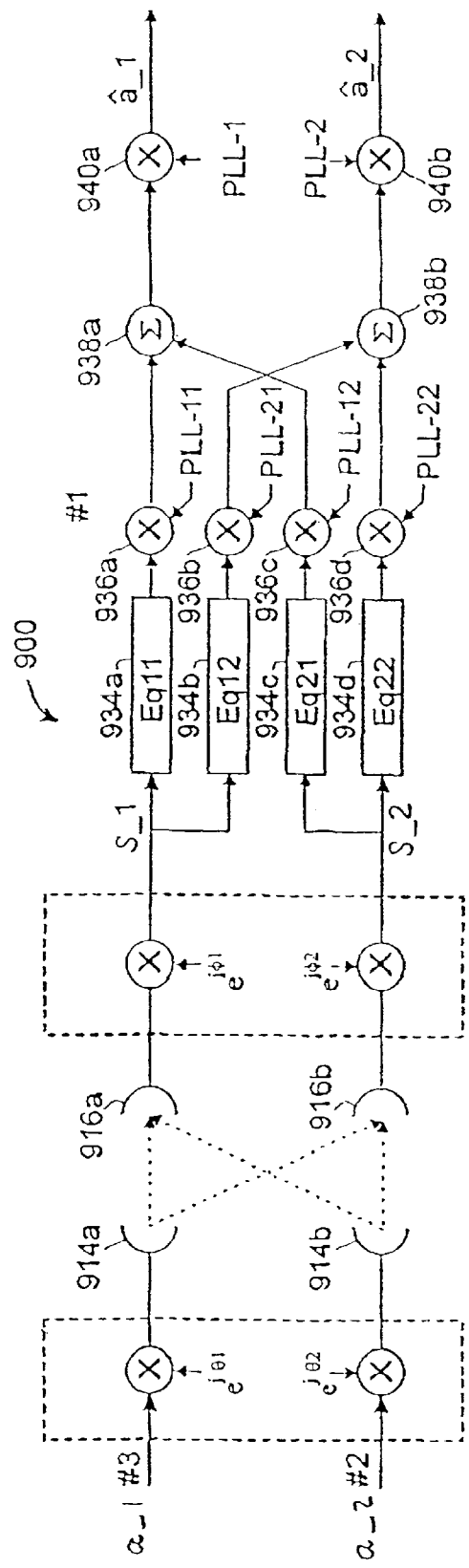
FIG. 9 is diagram of an embodiment of an adaptive equalizer for receive interference cancellation, according to the invention.

FIG. 9 illustrates a structure for a multidimensional adaptive equalizer 900, based on the multidimensional adaptive equalizer 600 of FIG. 6, with the addition of six phase locked loops (PLLs) 936*a*, 936*b*, 936*c*, 936*d*, 940*a* and 940*b* located at the branches of the multidimensional equalizer for mitigating phase noise in receive interference cancellation.

Phase noise at the transmitters is represented by $e^{j\theta 1}$ for node #3 transmitting over the antenna 914*a*, and by $e^{j\theta 2}$ for node #2 transmitting over the antenna 914*b*. Phase noise at the receiver is represented by $e^{j\phi 1}$ for the signal received by the antenna 926*a*, and by $e^{j\phi 2}$ for the signal received by the antenna 926*b*.

The fact that the PLLs and equalizer of FIG. 9 cancel the phase noise effects can be seen as follows. For decoding the symbol stream a_1, PLL 22 936*d* cancels $e^{j\phi 2}$, the phase noise of receive antenna 916*b*, and PLL-11 936*a* cancels $e^{j\phi 1}$, the phase noise of receive antenna 916*a*. An equalizer (934*a*, 934*b*, 934*c*, 934*d*, 938*a*, 938*b*) optimized for the system without phase noise (compare 634*a*, 634*b*, 634*c*, 634*d*, 638*a*, 638*b*) inverts the receive interference channel. Thus PLL-1 940*a* sees only $e^{j\theta 1}$, the phase noise of transmit antenna 914*a* with the desired symbol stream a_1. Similar arguments show that the same structure compensates for the noises in decoding the symbol stream a_2 received by the antenna 916*b*.

Figure 9A:
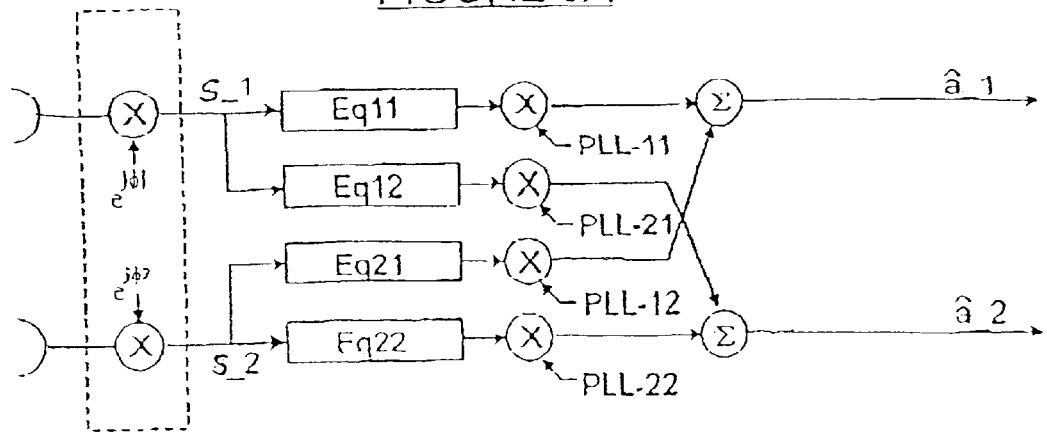
FIG. 9A is diagram of an alternate embodiment of an adaptive equalizer for receive interference cancellation, according to the invention.
Figure 9B:
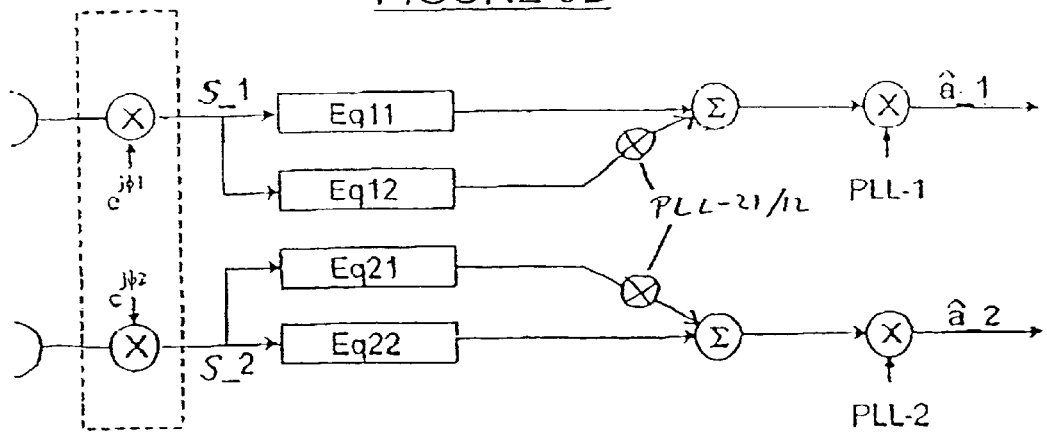
FIG. 9B is diagram of an alternate embodiment of an adaptive equalizer for receive interference cancellation, according to the invention.
Figure 9C:
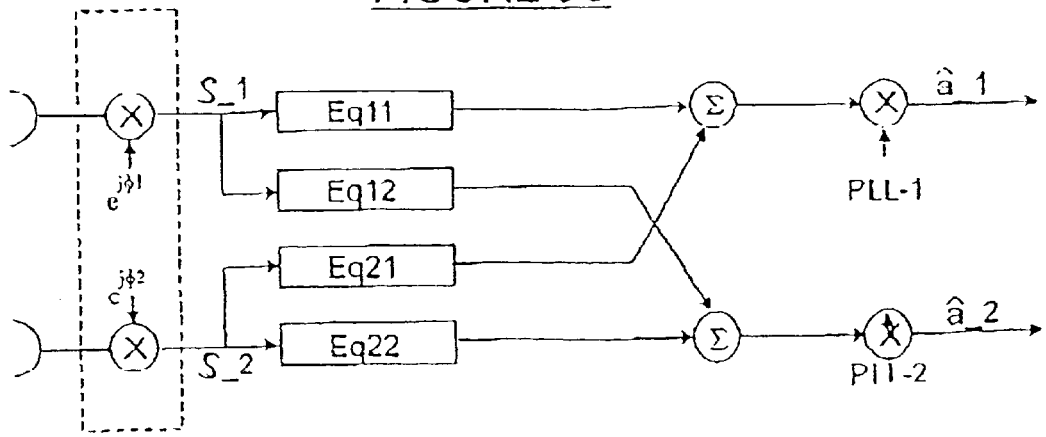
FIG. 9C is diagram of an alternate embodiment of an adaptive equalizer for receive interference cancellation, according to the invention.
Figure 9D:
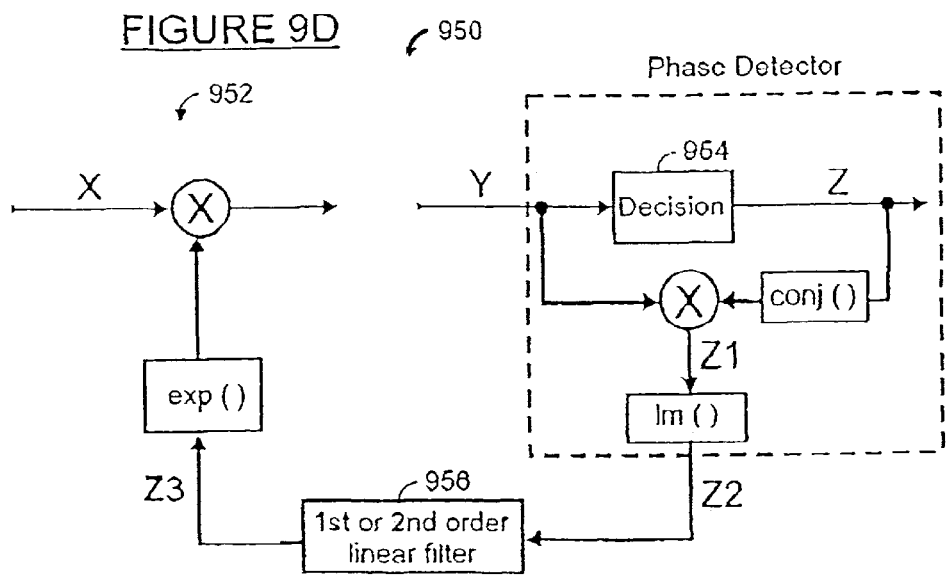
FIG. 9D is a block diagram of a typical PLL which can be used with the present invention to cancel phase noise.

A block diagram of a PLL 950, of the kind used in the present invention to cancel the phase noise, is illustrated in FIG. 9D. For example, consider the PLLs of FIG. 9. All of the PLLs appearing in that system may be of the form depicted in FIG. 9D, where the signals "X" and "Y" depend on the specific location of the phase corrector. For example, for the PLL-11, "X" is the signal at the output of Eq11, the mixer 952 of FIG. 9D is the multiplication device 936*a* of FIG. 9, and the signal "Y" is the output of the multiplication device 940*a* of FIG. 9. In principle, the decision device 954 of FIG. 9D is the decision of the relevant stream in FIG. 9. With reference to FIG. 9D, it is easy to verify that the signal Z2 is approximately the instantaneous phase difference between the signals "Y" and "Z". The instantaneous phase difference is subject to fluctuations due to symbol noise, thermal noise, etc., and thus it is filtered with a first or second order linear filter 956. The signal Z3 at the output of the filter 956 is the estimate of the phase error at the specific location of the PLL. PLLs are common devices in engineering systems, and many variations on their structure exist. The PLL of FIG. 9D is for illustration purposes only, to show that phase error cancellation is possible. The invention is not limited to this specific structure. For example, the phase detector can take into account phase corrections made by other PLLs in the system (coupled PLLs), etc.

Alternatively, the system of FIG. 9 can be implemented with fewer than the six PLLs described hereinabove. Referring again to symbol stream a_1, any one of the three PLLs PLL-11, PLL-21, or PLL-1, can be removed without affecting the overall performance. Similarly, with regard to the symbol stream a_2, any one the three PLLs PLL-22, PLL-12, or PLL-2, can be removed without affecting the overall performance. Thus, for example, if both PLL-1 and PLL-2 were removed, there would remain only 4 PLLs (-11, -21, -12, -22). This is illustrated in FIG. 9A.

Or, if PLL-11 and PLL-22 were removed, then the phases of PLL-12 and PLL-21 would be identical (up to a sign) and could be combined as one PLL-21/12, leaving only 3 PLLs. This is illustrated in FIG. 9B.

Furthermore, although common carrier at transmit antennas is not possible in MMW, it is possible to use a common reference at lower frequencies. This reduces the difference between phase noise originating from the receive antennas, which is, as discussed above, the main source of difficulty in combating phase noise in systems involving interference cancellation. In such a case, the receive interference canceller can be implemented with only two PLLs. Indeed, the phases $\phi 1$ and $\phi 2$ being identical (e.g., equal to $\phi$) can be added to the transmit phase noises $e^{j\theta 1}$ and $e^{j\theta 2}$. The equalizer inverts the channel. Now PLL-1 cancels $\theta 1+\phi$ and PLL-2 cancels $\theta 2+\phi$. Therefore PLL-11, PLL-21, PLL-12, and PLL-22 can be removed, leaving only two PLLs. This is illustrated in FIG. 9C.

With regard to receive interference cancellation, it is important to realize that since four sources of phase noise, and thus four phase noise processes, are involved, it is generally not possible to synchronize the carrier of the receive interference signal with that of the desired signal, since these signals come from transmitters located at different sites (e.g., nodes #2 and #3)

Transmit Interference Cancellation, with Phase Noise

Figure 10:
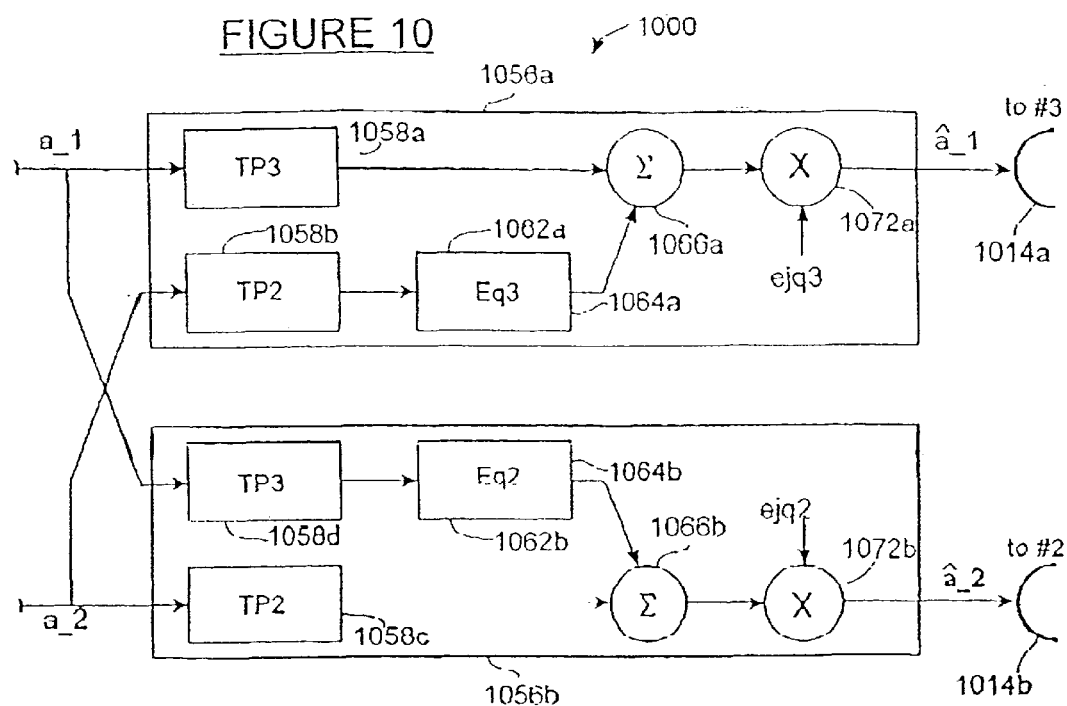
FIG. 10 is diagram illustrating an embodiment of a transmit interference canceler for transmit interference cancellation, located at a middle node (#1) of a typical chain of links/ring network, according to the invention.

FIG. 10 illustrates a structure for a transmit interference canceler 1000, based on the transmit interference canceler 800 of FIG. 8, which would be located at a transmitting node (e.g., Node #1). Two transmitters 1056a and 1056b are shown, connected respectively to two antennas A 1014a and B 1014b. The antenna 1014a is directed to node #3. The antenna 1014b is directed to node #2. Symbols a_1 and a_2, are provided to transmitters 1056a and 1056b respectively, to be transmitted to node #3 and to node #2, respectively.

The source of phase noise impairments in transmit interference cancellation is the difference which may exist between the phase noises at the corresponding transmit radio paths. In transmit interference cancellation, the transmitter of the desired signal and that of the interfering signal are located in the same site, and therefore carrier synchronization is possible. This fact is crucial, since in transmit interference cancellation, the equalizers located at a given node opt to optimize performance at another node. This implies that for such a scheme to be practically feasible, the adaptation process must be slow. Otherwise, high rate feedback (wayside channel) is required, reducing the net capacity of the ring and rendering the system impractical. Phase noise of a typical MMW carrier is a fast process, therefore for the system to be practically implemented, the phase noises theta_2 and theta_3 must be approximately the same—i.e., some degree of carrier synchronization must be achieved. Using a common low frequency reference for the carriers transmitted via antenna 1014a and antenna 1014b of node #1 can accomplish this.

It should be noted that in transmit interference cancellation only three phase noise sources are involved—two ($e^{j\theta 3}$ and $e^{j\theta 2}$) at the transmitters and one (e.g., $e^{j\Phi 1}$) at the receiver. However, since the phase noise sources at the transmitters can (and must) be synchronized ($e^{j\theta 3}=e^{j\theta 2}$), only two phase noise processes ($e^{j\theta 3}$ and $e^{j\Phi 1}$) are present.

Utility of the Invention

The present invention of receive interference cancellation and/or transmit interference cancellation is useful in many of the instances of receive and transmit interference, such as were described hereinabove, as follows:

A) Without ATPC, Same Modulation for all links: Link lengths may not be constant along the chain/ring, depending on the physical locations of the nodes. Moreover, according to weather conditions, one link can suffer from high attenuation due to rain, while the other can see clear sky. Typical accumulated rain attenuation value in MMW links can reach 30 dB in bad weather conditions. Thus the dynamic range of receive interference to desired receive signal can be very high, from the range of −60 to −40 dB without rain, to the range of −30 to −10 dB, depending on angles between antennas and weather conditions. Instances of receive interference at a level of −30 dB and above will typically greatly benefit from the use of receive interference cancellation.

B) With ATPC, Same Modulation for all links: Typical values of ATPC in MMW systems is 10 to 25 dB dynamic range. With 20 dB ATPC, the receive interference may be reduced to −20 dB, or worse. These situations facilitate the use of receive interference cancellation.

C) Without ATPC, Different Modulations along the chain/ring: Employing different modulations along the chain/ring further increases the dynamic range of receive interference to desired signal. In the absence of ATPC, each antenna transmits with the maximal possible power. When different modulations are employed, the maximal power varies according to the required back-off. The difference in back-off required for 16 QAM and 128 QAM is in the order of 5 dB (this takes into account not only the different peak-to-r.m.s. of the constellations, but also the sensitivity to impairments). Consider, for example, the following. Assume, for example, that the link 416 from node #2 404 to node #1 402 in FIG. 4 employs 16 QAM (or 16 TCM), while the link 418 from node #3 406 to node #1 402 employs 128 QAM (or 128 TCM). This enhances the receive interference at antenna 402a by an amount of 4 dB, due to the fact that the back-off required by the transmitter in node #3 406 is larger by 5 dB than that required by the transmitter in node #2 404. Since ATPC is not present, the fact that decoding 16 QAM needs lower received power cannot be taken into account. Thus, the conclusion is, as in the case of fixed modulations among the three stations, when no ATPC is present, the ratio between receive interference and desired signal can exceed considerably the value of −30 dB. In these cases, receive interference cancellation will be of great benefit.

D) With ATPC, Different Modulations alone the chain/ring: In this case, the receive interference is increased relative to that in case B (with ATPC, same modulation) by an amount equal to the difference in sensitivity. The difference in sensitivity between 16 QAM and 128 QAM may typically be 9 dB. Thus the interference may be roughly only 10 dB below the desired signal. In these cases, using receive interference cancellation is not necessary.

E. Without ATPC, Same Modulation for all links: In this case, the ratio of transmit interference to desired signal is determined solely by the amount of out-of-main beam leakage (directivity) of the antenna and the neighborhood of the antenna. This is due to the fact that even in case of strong rain attenuation, the desired and interfering signals are subject to the same rain attenuation, and the constellations and transmission power are similar. Thus the transmit interference is very weak in case of good direction separation (for MMW, about −60 to −40 dB), and can deteriorate to −30 dB or below, depending on the angle between the links and the site geometry. Transmit interference cancellation may be of only limited utility, in some instances.

F. With ATPC, Same Modulation for all links: Typical ATPC dynamic range is 10 to 20 dB. With 20 dB ATPC, transmit interference to desired signal ratio can reach a level of −20 dB. In these instances, transmit interference cancellation would be beneficial.

G. Without ATPC, Different Modulations along the chain/ring: Transmit interference deteriorates from the situation of no ATPC and one modulation, by an amount equal to the differences between required back-off, which may reach values of the order of 5 dB between 16 QAM and 128 QAM for example. This results in a value of about −25 dB transmit interference. The maximal allowed interference at each modulation is determined by its sensitivity. In these cases, transmit interference cancellation should be employed.

H. With ATPC, Different Modulations along the chain/ring: In this case transmit interference may deteriorate by an amount of 5 dB relative to the case of ATPC with one modulation scheme. Thus it may reach −15 dB or worse. These instances can also benefit from transmit interference cancellation.

System Setup

As described hereinabove, a feedback channel is required for transmit interference cancellation to work, but no feedback channel is required for receive interference cancellation to work. Since a feedback channel is not available at system initialization, it is desirable to have a setup process that will not need transmit interference cancellation for starting the system. Once the receive interference cancellation is established, the feedback channel will exist, and transmit interference cancellation will be possible. Two setup schemes are described hereinbelow. It should be noted that the setup schemes do not refer to one building block only, but treat the whole system (ring/chain of links) as a whole. In particular, the setup schemes do not depend on the specific distribution of licenses along the chain of links/ring. It is important to emphasize that these are examples only, to demonstrate that system setup possible even in systems using feedback which is not available before setup is completed.

According to a first setup scheme ("simultaneous setup"), at system initialization, ATPC is turned off, so dynamic range of transmit interference is minimized. This ensures that transmit interference is kept relatively low. The transmit interference cancellation is also turned off, since there is no information available about performance of adjacent nodes, and thus no adaptation can take place. Only the adaptive receive interference cancellers are on. The multidimensional equalizers of the receive interference cancellation devices are "trained" as the system boots. When the system is up and the feedback channel is available, the transmit interference cancellation devices are turned on, and start their adaptation process. The ATPC is turned on only after the transmit interference cancellers have acquired channel knowledge, i.e., have converged to steady state. Note that this scheme is applicable only when the geometry and the modulations employed guarantee that wayside channels can be set without ATPC.

According to a feature of the simultaneous setup scheme, to facilitate set up, two different modulation rates can be used that employ the same bandwidth. A low rate modulation (small constellation) is used at system setup. This is advantageous since small modulation can bear higher transmit interference. After the nodes have been setup, the system can pass to a higher rate modulation. When passing from small constellation to a higher constellation, the adaptive algorithms have only to update the gains of the transmit interference canceller and receive interference canceller.

The second setup scheme is referred to as "link-by-link setup". To illustrate this scheme, reference is made to the chain of links/ring network of FIG. 2. Initially, nodes #2 and #3 transmit to node #1 only. Since no transmission is done to nodes #4 and #5, no transmit interference cancellation is needed at nodes #2 and #3, even if these are implemented with the same spectrum license. After these two links have been set up, feedback channels are available from #3 to #1 and from #2 to #1. At this stage, #1 can activate its transmit interference cancellation devices, and start transmitting to nodes #2 and #3. After these two links have been established, we proceed along the ring/chain, from node #1 clockwise and counterclockwise. Node #2 has wayside channel information from #1, so it can activate transmit interference cancellation to its transmission to node #1, and after that, starts transmission to node #4. Similarly, node #3 has wayside channel information from node #1, thus it activates its transmit interference cancellation to the transmission to node #1, and then starts transmission to node #5, and so on. Continuing in this manner, the whole ring/chain is being set up link by link. The main idea that a given node always starts transmission in two steps. First, transmission to only one adjacent node is established. Only when feedback channel from this node is available, transmit interference cancellation is activated, and then transmission to the other adjacent node starts. It should be noted that, whenever a transmission starts, its ATPC can be immediately activated. This link-by-link setup scheme is advantageous over the simultaneous setup scheme in situations where in the absence of ATPC, the receive interference is so strong that link setup is not possible.

Although the invention has been described with respect to a limited number of embodiments, it will be appreciated that many variations, modifications and other applications of the invention may be made, and are intended to be within the scope of the invention, as disclosed herein.

For example, the present invention can advantageously be incorporated with the invention set forth in the aforementioned PCT/US01/24913, which discloses the use of multi-antenna transmit and receive arrays, with and without dual polarization, to improve spectral efficiency of millimeter wave (MMW) communications between two locations. The technique exploits array geometry in combination with suitable transmit shaping and receive equalization to increase the number of effective channels between two locations The geometry of the antenna arrays, the transmit shaping and the receive equalization are determined according to the carrier frequency and the link length (distance between the antenna arrays) to optimize performance, (e.g., as measured in terms of residual mean-squared error at equalizer outputs). Generally speaking, each of a plurality of receive antenna elements receives signals transmitted from all of the transmit antenna elements with differing degrees of phase shift. At the receiver, the signals are combined in a manner which emphasizes one channel and substantially cancels out all others, thereby achieving channel separation, and consequently increasing spectral efficiency. The spectral efficiency can further be increased by using dual polarization techniques.

What is claimed is:

1. A communication system comprising:
   a serial chain of nodes comprising a middle node a first adjacent node on a one side of the middle node and a second adjacent node on an opposite side of the middle node;
   each of the middle, first adjacent and second adjacent nodes comprising a transmitter and a receiver;
   a first antenna at the middle node for transmitting and receiving over a first link with the second adjacent node;
   a second antenna at the middle node for transmitting and receiving over a second link with the first adjacent node; and
   means for performing interference cancellation in one or both of the transmitter and receiver of the middle node.

2. A communication system, according to claim 1, wherein the means for performing interference cancellation comprises:
   a multidimensional equalizer in the receiver of the middle node for performing receive interference cancellation.

3. Communication system, according to claim 2, wherein the first antenna receives a first signal, the second antenna receives a second signal, and the multidimensional equalizer comprises:
- a first (inline) equalizer block having an input receiving the first signal, and an output;
- a second (cross) equalizer block having an input receiving the first signal, and an output;
- a third (cross) equalizer block having an input receiving the second signal, and an output;
- a fourth (inline) equalizer block having an input receiving the second signal, and an output;
- a first summing junction having two inputs and an output; and
- a second summing junction having two inputs and an output;

wherein:
- the outputs of the first and third equalizer blocks are connected to the two inputs of the first summing junction;
- the outputs of the second and fourth equalizer blocks are connected to the two inputs of the second summing junction;
- the output of the first summing junction provides an interference-cancelled version of the first signal; and
- the output of the second summing junction provides an interference-cancelled version of the second signal.

4. Communication system, according to claim 3, wherein:
the second and third equalizers are different than the first and fourth equalizers.

5. Communication system, according to claim 3, wherein:
the second and third equalizers are adaptive equalizers.

6. Communication system, according to claim 3, wherein:
each of the equalizer blocks comprises a multidimensional adaptive equalizer.

7. Communication system, according to claim 2, wherein the first antenna receives a first signal, the second antenna receives a second signal, and the multidimensional equalizer comprises:
- a first (inline) equalizer block having an input receiving the first signal, and an output;
- a second (inline) equalizer block having an input receiving the second signal, and an output;
- a third (cross) equalizer block having an input connected to the output of the first equalizer block, and an output;
- a fourth (cross) equalizer block having an input connected to the output of the second equalizer block, and an output;
- a first summing junction having two inputs and an output; and
- a second summing junction having two inputs and an output;

wherein:
- the outputs of the first and fourth equalizer blocks are connected to the two inputs of the first summing junction;
- the outputs of the second and third equalizer blocks are connected to the two inputs of the second summing junction;
- the output of the first summing junction provides an interference-cancelled version of the first signal; and
- the output of the second summing junction provides an interference-cancelled version of the second signal.

8. Communication system, according to claim 7, wherein:
the third and fourth equalizer blocks are adaptive.

9. A communication system, according to claim 1, wherein the transmitter of the middle node comprises:
a transmit interference canceller in the transmitter of the middle node for performing transmit interference cancellation.

10. A communication system, according to claim 1, wherein the transmitter of the middle node comprises:
- two transmitters, connected to the two antennas, respectively;
- each transmitter comprising means for receiving a signal and for transmitting an interference cancelled version of the signal to a respective one of the adjacent nodes.

11. A communication system, according to claim 1, wherein the transmitter of the middle node comprises:
- a first transmitter comprising means for convolving a first signal intended for transmission to the second adjacent node with an equalized version of a second signal intended for transmission to the first adjacent node, and for providing a resulting first convolved/equalized signal to the first antenna; and
- a second transmitter comprising means for convolving the second signal with an equalized version of the first signal, and for providing a resulting second convolved/equalized signal to the second antenna.

12. Communication system, according to claim 1, wherein:
the antennas are selected from the group consisting of single antenna, multi antenna, dual polarization, and combinations thereof.

13. Method of improving the frequency re-use of links in a communication network comprising a serial chain of a middle node a first adjacent node on a one side of the middle node and a second adjacent node on an opposite side of the middle node, the middle node having a first antenna for communicating with the first adjacent node and a second antenna for communicating with the second adjacent node, the method comprising:
at the middle node, performing interference cancellation, selected from the group consisting of receive interference cancellation and transmit interference cancellation.

14. Method, according to claim 13, further comprising:
performing receive interference cancellation without mitigating phase noise.

15. Method, according to claim 13, further comprising:
performing receive interference cancellation with mitigating phase noise.

16. Method, according to claim 15, further comprising:
mitigating phase noise by using a common carrier reference.

17. Method, according to claim 13, further comprising:
performing transmit interference cancellation without mitigating phase noise.

18. Method, according to claim 13, further comprising:
performing transmit interference cancellation with mitigating phase noise.

19. Method, according to claim 18, further comprising:
mitigating phase noise by using a common carrier reference.

20. Method, according to claim 13, further comprising:
employing Automatic Transmitter Power Control (ATPC) at the nodes.

21. Method, according to claim 13, further comprising:

employing various modulations on links between the various nodes of the network.

22. Method, according to claim 13, further comprising a method of setting up the links of the network comprising:

in a first step, activating only receive interference cancellation;

in a second step, making a feedback channel available, and in a third step, activating transmit interference cancellation.

23. Method, according to claim 22, wherein the method of setting up is performed link-by-link, sequentially, for each node.

24. Method, according to claim 22, further comprising:

employing Automatic Transmitter Power Control (ATPC) at the nodes; and turning ATPC off during setup.

25. Method, according to claim 13, wherein:

the communication system is a millimeter wave (MMW) communication system.

* * * * *